Patented Mar. 3, 1925.

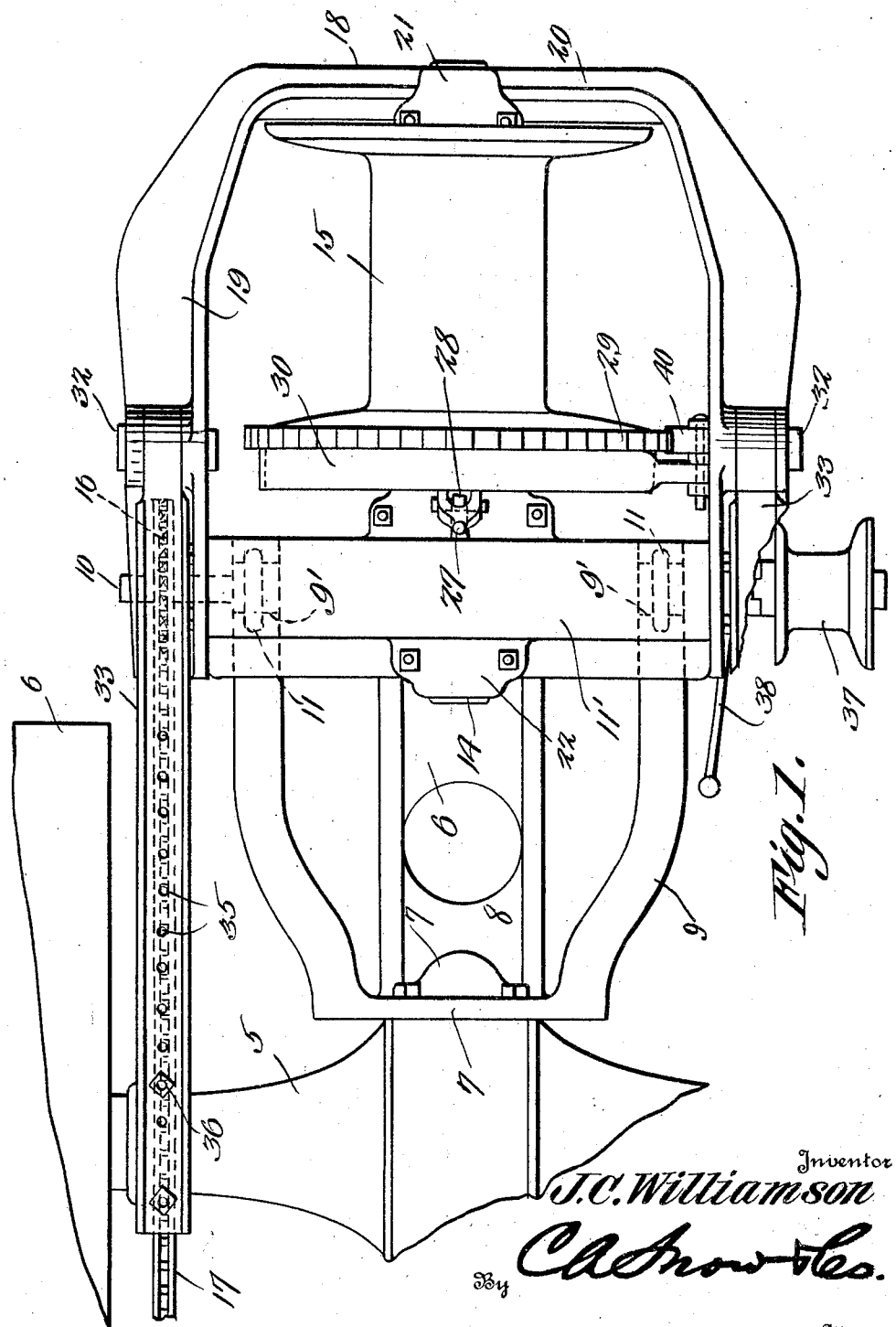

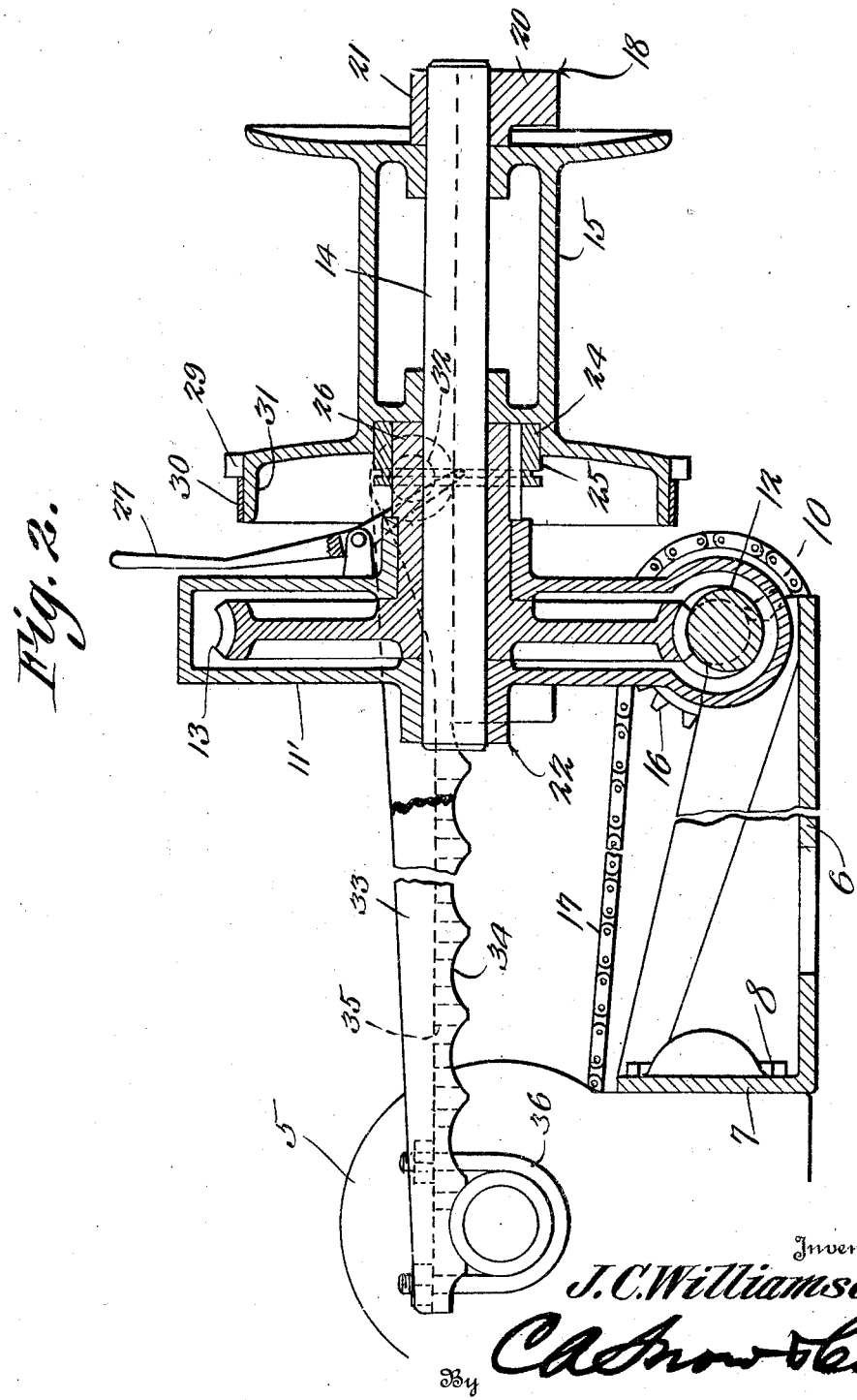

1,528,284

UNITED STATES PATENT OFFICE.

JAMES C. WILLIAMSON, OF CORDELE, GEORGIA, ASSIGNOR OF TWO-THIRDS TO D. S. WILLIAMSON AND F. D. WILLIAMSON, BOTH OF CORDELE, GEORGIA.

STUMP PULLER.

Application filed July 7, 1923. Serial No. 650,026.

*To all whom it may concern:*

Be it known that I, JAMES C. WILLIAMSON, a citizen of the United States, residing at Cordele, in the county of Crisp and State of Georgia, have invented a new and useful Stump Puller, of which the following is a specification.

This invention has reference to stump pullers, and more particularly a stump puller especially designed for attachment to the usual tractor construction.

The primary object of the invention is to provide a device of this character which may be adjustably supported with respect to the tractor frame, with which the same has connection, whereby the drum forming a part of the stump puller may be operated at various angles with respect to the tractor frame, thereby adapting the device for various usages.

Another important object of the invention is to provide means for supporting the stump puller frame to insure against movement thereof, after the same has been adjusted to its operative position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a plan view disclosing a stump puller constructed in accordance with the invention as secured to a tractor.

Figure 2 is a longitudinal sectional view through the stump puller, the supporting arms being shown in elevation.

Referring to the drawings in detail, the reference character 5 designates the rear axle housing of the usual tractor, on which the usual wheels 6 are mounted.

Bolted to the rear of the axle housing 5 is a supporting plate indicated at 6, formed with a right angled portion 7 through which the securing bolts 8 pass to secure the same in position.

This plate 6 is formed with curved supporting members 9 that are designed to receive bearings 9' forming a part of the gear housing to be hereinafter more fully described to support the bulk of the weight of the stump puller frame, inverted U-bolts 11 being provided and cooperating with the curved supporting members 9 to secure the stump puller to the supporting plate 6.

The shaft 10 extends through the lower portion of the gear housing 11' and carries the worm 12 that meshes with the gear 13 operating in the gear housing, the gear 13 being secured to the drum shaft 14 to rotate the drum 15. Supported on one end of the shaft 10 is a sprocket 16, that receives power through the chain 17 that moves over a sprocket wheel not shown, supported on the usual power shaft of a tractor.

The stump puller frame is indicated generally by the reference character 18 and includes parallel arms 19 connected with the gear housing 11' at points substantially intermediate the height of the gear housing. Connecting the arms 19, is a horizontal bar 20 formed with a bearing 21 disposed intermediate its ends, in which one end of the drum shaft 14 is positioned, the opposite end of the drum shaft being positioned in the bearing 22 formed integral with the gear housing 11'. The drum 15 is loosely supported on the drum shaft 14, and is provided with a clutch face 24 to be engaged by the clutch member 25 that is splined on one end of the hollow shaft 26 formed integral with the gear 13.

A clutch operating lever is indicated at 27 and is pivotally supported by the ears 28 that extend laterally from the gear housing 11, one end of the clutch operating lever 27 being connected to the clutch member 25, so that movement of the clutch lever will result in a relative movement of the clutch member 25 to throw the drum into and out of operation. In order that the drum will be normally held against reverse movement while the flexible cable used in stump pulling is being wound thereon, ratchet teeth 29 are formed on one end of the drum 15, which ratchet teeth are engaged by the pawl 40 which is pivotally supported by the frame 18.

A brake band for retarding the movement of the drum is indicated at 30 and moves over the flange 31 of the drum 15, whereby the operator may by bringing the brake band into operation, brake the movement of the drum 23.

Pivotally connected with the arms 19 of the frame 18 at 32 are the adjusting arms 33, which are formed with curved portions 34 designed to fit over the upper curved surface of the axle housing 5, openings 35 being provided in the adjusting arms 33 to receive the U-bolts 36 for clamping the adjusting arms in position.

From the foregoing it will be obvious that should it be desired to move the frame 18 to a position to cause the drum 15 to operate in a vertical plane, it is only necessary to disconnect the arms 33 and swing the frame 18 upwardly, whereupon the arms 33 may be secured by positioning the U-bolts 36 in a manner as shown by Figure 2 of the drawings.

It might be further stated that a rehaul drum 37 is secured on one end of the shaft 10, and may be thrown into operation by means of the clutch lever 38, so that the cable employed in stump pulling may be readily returned to its pulling position, after a stump has been extracted.

I claim as new:—

1. A stump puller for attachment to a tractor, comprising a frame a pivoted frame mounted on the first mentioned frame, a drum mounted in the pivoted frame, arms having pivotal connection with the pivoted frame, means for adjustably connecting the arms to the tractor, and means for transmitting movement to the drum.

2. A stump puller for attachment to a tractor, comprising a frame, a drum mounted within the frame, a supporting plate having curved supporting members, a gear housing disposed at one end of the frame, bearings extending from the gear housing and having portions thereof resting in the curved supporting members, and arms pivotally connected with the frame and connecting the frame to the tractor.

3. A stump puller for attachment to a tractor, comprising a frame having side members, a drum mounted within the frame a shaft on which the drum is mounted, said shaft extending in parallel relation with the side members of the frame, means for connecting the frame to the tractor to permit the frame to swing in a vertical plane to a position above the tractor frame, and cause the shaft to operate in a vertical plane, and means having connection with the frame and adjustably connected with the tractor for holding the frame in various positions of adjustment.

4. A stump puller for attachment to a tractor, comprising a frame, means for securing the frame to the tractor to permit of vertical adjustment of the frame with respect to the tractor, a drum mounted on the frame, arms having pivotal connection with the frame and having curved portions formed along the lower edges thereof, said curved portions adapted to fit over the rear axle housing of a tractor, means embracing portions of the rear axle housing and having connection with the arms to secure the arms in various positions of adjustment, and means for transmitting motion to the drum.

5. In a stump puller for attachment to a tractor frame, a pivoted frame, means for connecting the pivoted frame to the tractor frame, arms having connection with the pivoted frame and adapted to engage the tractor frame for securing the pivoted frame at various angles with respect to the tractor frame, and a drum mounted on the pivoted frame.

In testimony that I claim the foregoing as my own, I have hereto affixed my signature in the presence of two witnesses.

JAMES C. WILLIAMSON.

Witnesses:
 IVY E. SIMPSON,
 AGNES ROCKELLI.